US007641217B2

(12) United States Patent
Yoo et al.

(10) Patent No.: US 7,641,217 B2
(45) Date of Patent: Jan. 5, 2010

(54) DETACHABLE MOBILE SEAT FOR VEHICLE USABLE AS WHEELCHAIR

(75) Inventors: Yeon Sang Yoo, Pyeongtaek-si (KR); Ju Young Lee, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 279 days.

(21) Appl. No.: 11/796,403

(22) Filed: Apr. 27, 2007

(65) Prior Publication Data

US 2008/0136128 A1 Jun. 12, 2008

(30) Foreign Application Priority Data

Dec. 12, 2006 (KR) ..................... 10-2006-0126548

(51) Int. Cl.
*B62B 7/06* (2006.01)

(52) U.S. Cl. ......................... 280/646; 280/43; 280/643; 280/304.1; 180/21; 180/208; 180/209; 180/907; 180/908; 297/16.1; 297/31; 297/51; 297/55; 297/30; 297/68; 297/69; 297/70; 297/423.25; 297/423.36

(58) Field of Classification Search .................. 280/43, 280/643, 646, 304.1; 180/21, 208, 209, 907, 180/908; 297/16.1, 31, 51, 55, 30, 68, 69, 297/70, 423.25, 423.36, DIG. 4
See application file for complete search history.

(56) References Cited

U.S. PATENT DOCUMENTS 3,050,050 A * 8/1962 Kubicek ...................... 601/91
4,231,614 A * 11/1980 Shaffer ....................... 297/330
4,375,840 A * 3/1983 Campbell .................. 180/6.5
4,483,653 A 11/1984 Waite
4,834,409 A * 5/1989 Kramer ...................... 180/209
5,203,610 A * 4/1993 Miller .................. 297/344.16
5,255,934 A * 10/1993 Wilson ...................... 280/657
6,582,181 B2 * 6/2003 Suehiro et al. .............. 414/812
7,360,841 B2 * 4/2008 Barlow et al. .......... 297/423.36

FOREIGN PATENT DOCUMENTS

| | | |
|---|---|---|
| JP | 2000-107232 | 4/2000 |
| JP | 2002-119543 | 4/2002 |
| JP | 2003-048469 | 2/2003 |
| JP | 2003-212013 | 7/2003 |
| JP | 2004-049910 | 2/2004 |
| JP | 2004-148093 | 5/2004 |
| JP | 2005-034325 | 2/2005 |
| KR | 1020060058803 | 6/2006 |

* cited by examiner

*Primary Examiner*—Paul N Dickson
*Assistant Examiner*—Jacob Meyer
(74) *Attorney, Agent, or Firm*—Morgan, Lewis & Bockius LLP

(57) ABSTRACT

A detachable mobile seat includes a first part connected to a motor; a second part attached to the seat; and two links, each connected to the first part, the second part, and a wheel. The links transfer movement of the first part to the wheels. The first part includes a shaft connected to the motor, and two nuts disposed around the shaft that have screw threads in opposite directions and move along the shaft in response to operation of the motor. Each link includes a first link connected to the second part and to the nut, and a second link connected to the nut and to the wheel. The end of each second link that is nearest the wheel is rotatably connected to a connecting arm that has a rotating bar that rotates the wheel in response to operation of the links.

4 Claims, 2 Drawing Sheets

DETACHABLE MOBILE SEAT FOR VEHICLE USABLE AS WHEELCHAIR

CROSS-REFERENCE TO RELATED APPLICATION

This application claims priority to, and the benefit of, Korean Patent Application No. 10-2006-0126548, filed in the Korean Intellectual Property Office on Dec. 12, 2006, the entire contents of which are incorporated herein by reference.

BACKGROUND OF THE INVENTION (a) Field of the Invention

The present invention relates to a detachable mobile seat for a vehicle that is usable as a wheelchair, that allows handicapped persons to easily board a vehicle.

(b) Description of the Related Art

Wheelchair height differs from a height suitable for a vehicle seat. Therefore, a wheel supporting part of a conventional detachable mobile seat is foldable. However, the wheels may interfere with the surrounding parts of the seat during folding, and a conventional folding structure is not structurally stiff.

SUMMARY OF THE INVENTION

A detachable mobile seat includes a first part connected to a motor; a second part attached to the seat; and two links, each connected to the first part, the second part, and a wheel. The links transfer movement of the first part to the wheels.

The first part may include a rotating shaft connected to the motor and supported near first and second ends by a support frame, and two nuts disposed around the rotating shaft that move axially along the rotating shaft in response to operation of the motor. The nuts may have screw threads in opposite directions. The first part may also include a support bar connected to the support frame.

Each link may include a first link connected to the second part and to the nut, and a second link connected to the nut and to the wheel.

The end of each second link that is nearest the wheel may be rotatably connected to a connecting arm that has a rotating bar that rotates the wheel in response to operation of the links.

DETAILED DESCRIPTION OF THE PREFERRED EMBODIMENTS

An exemplary embodiment of the present invention will hereinafter be described in detail with reference to the accompanying drawings.

Figure 1:
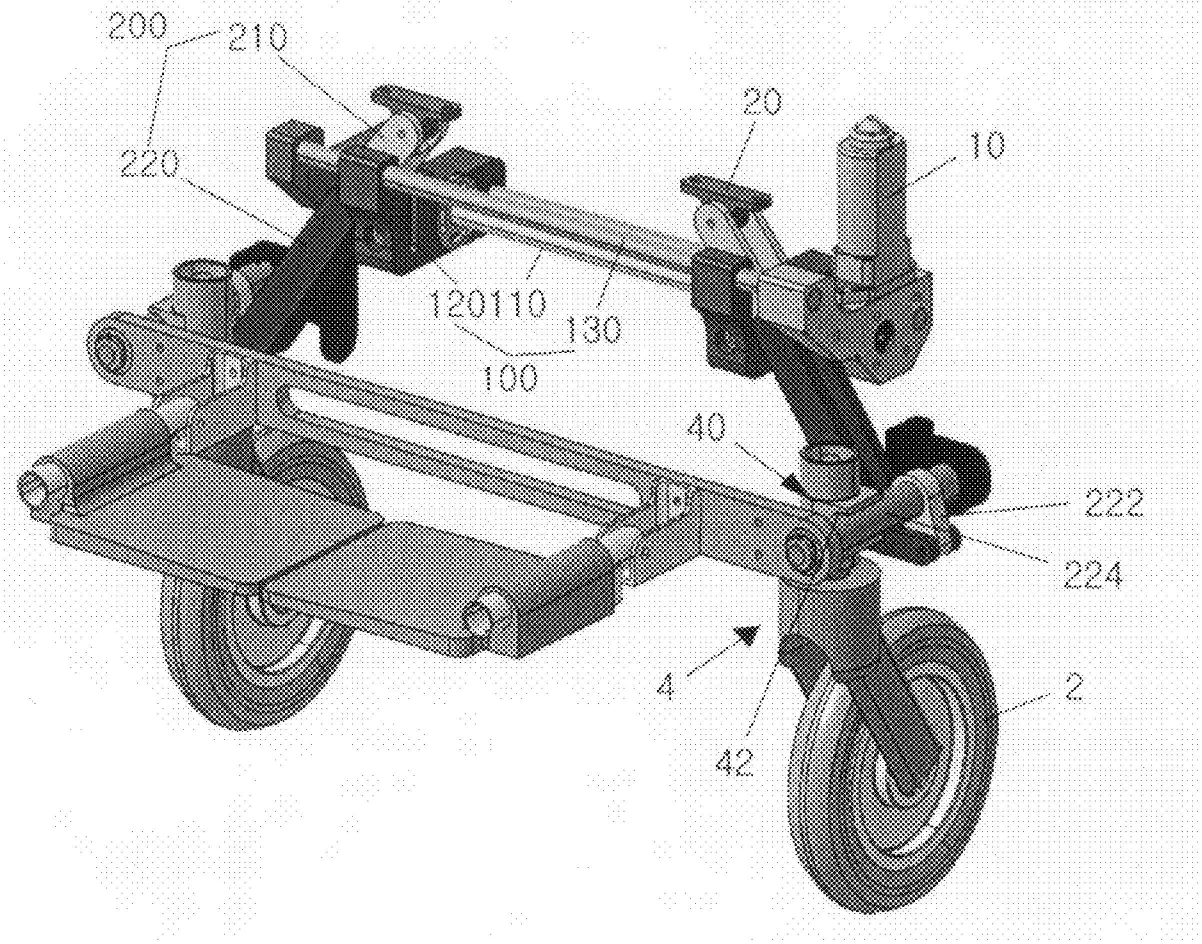
FIG. 1 shows a detachable mobile seat for a vehicle usable as a wheelchair according to an exemplary embodiment of the present invention.

Referring to FIG. 1, a motor shaft of a motor 10 is connected to a transportation part 100, which is disposed in a horizontal direction at a front lower side of a wheelchair seat (not shown). One end of a folding link 200 is connected to a mount part 20, which is attached to the underside of the wheelchair seat. The other end of the folding link 200 is connected to a front wheel 2 of the wheelchair so as to transfer movement of the transportation part 100 to the front wheel 2.

The transportation part 100 includes a rotating shaft 110, which is connected to the motor shaft of the driving motor 10, and both ends of which are fixed to a support frame 30. The rotating shaft 110 is inserted into transportation nuts 120. The transportation nuts 120 each include screw threads in opposite directions. The nuts 120 move toward the center of the rotating shaft 110 when the driving motor 10 rotates in one direction, and move toward the ends of the rotating shaft 110 when the driving motor 10 rotates in the other direction.

The transportation part 100 also includes at least one support bar 130 which is horizontally connected to the support frames 30 to provide stiffness.

The folding link 200 includes a first folding link 210, one end of which is connected to the mount part 20, and the other end of which is connected to the transportation nut 120; and a second folding link 220, one end of which is connected to the transportation nut 120, and the other end of which is connected to a joint 40 of the front wheel 2.

The joint 40 is provided with a joint groove 42, one end of which is connected to a rotating shaft of the front wheel 2.

The second folding link 220 is rotatably connected to one end of a connecting arm 222. The other end of the connecting arm 222 is provided with a rotating bar 224 which is inserted into the joint groove 42 to rotate the front wheel 2 inward in response to operation of the folding link 200.

Operation of a detachable mobile seat for a vehicle usable as a wheelchair according to an exemplary embodiment of the present invention will now be explained with reference to the drawings.

Figure 2A:
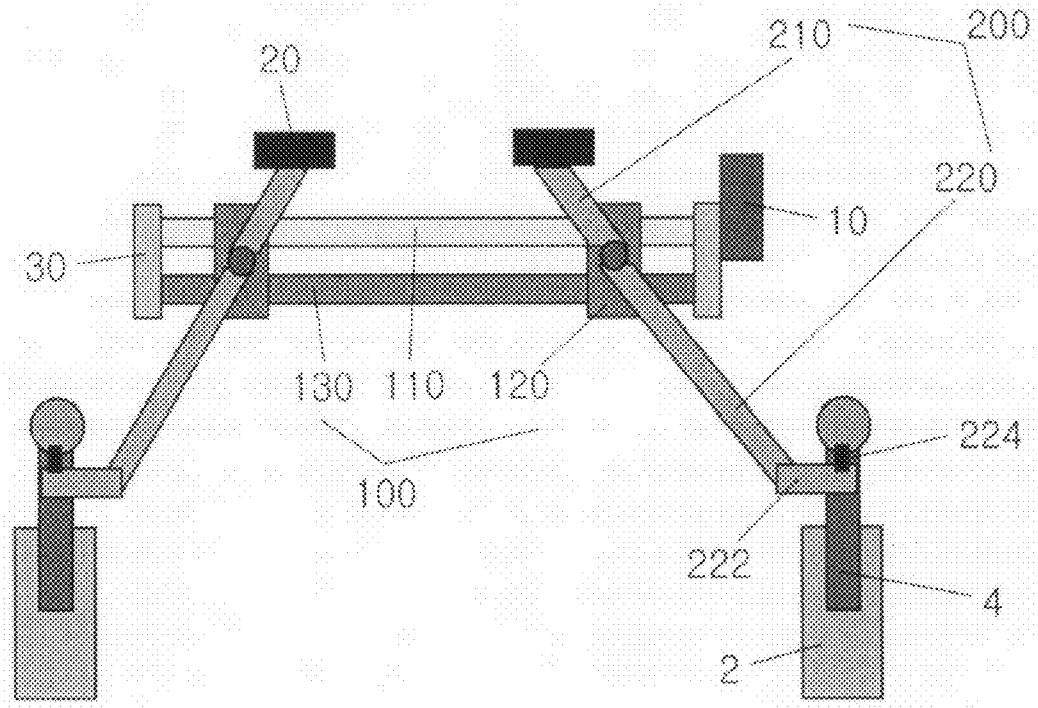
FIG. 2A and FIG. 2B show operation of the seat of FIG. 1.
Figure 2B:
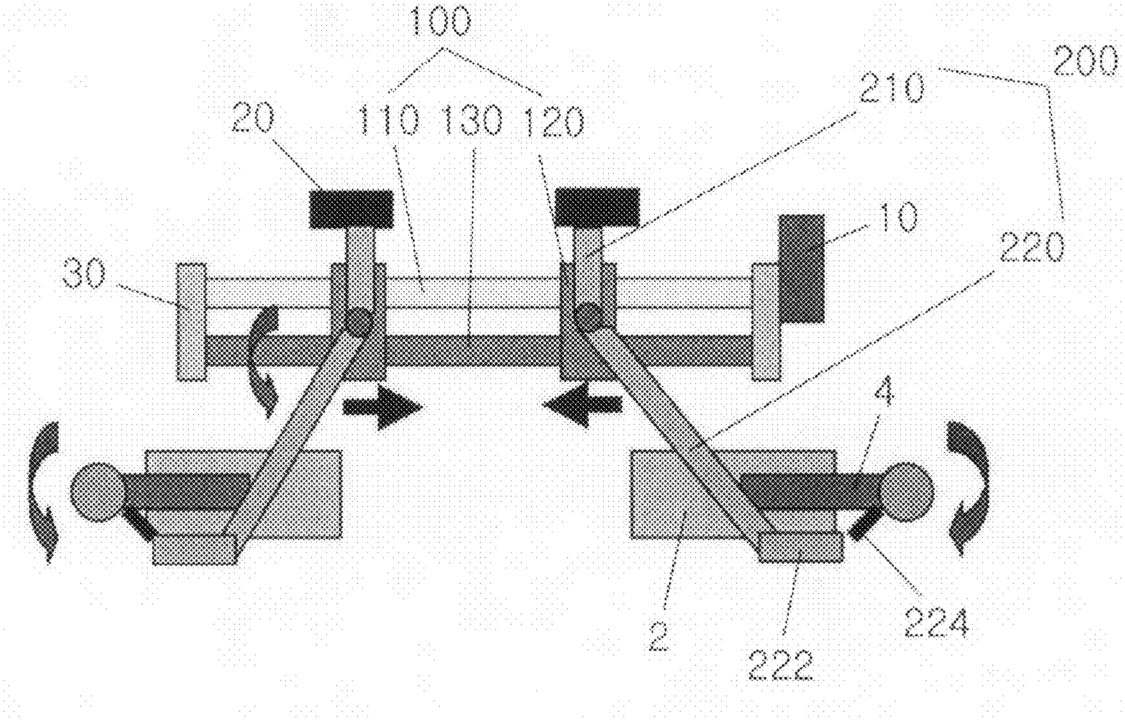

Referring to FIG. 2A, to allow a person to board the vehicle, the driving motor 10 is operated and the rotating shaft 110 rotates in a first direction. Referring also to FIG. 2B, while the rotating shaft 110 rotates, the transportation nuts 120 move along the rotating shaft 110 in the directions of the arrows.

The folding links 200 fold from the position shown in FIG. 2A to that of FIG. 2B. At this time, the rotating bars 224 rotate in the direction of the arrows along the joint grooves 42 and the front wheels 2 are folded inward. The support bar 130 supports the transportation nuts 120.

As described above, the wheels of a seat according to the present invention do not interfere with surrounding structures, and sufficient structural stiffness is provided. Furthermore, a structural weak point is supported.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus, comprising:

a first part connected to a motor;

a second part configured to be attached to a seat; and a link connected to the first part, the second part, and a wheel, configured to transfer movement of the first part to the wheel;

wherein the first part comprises:

a rotating shaft connected to the motor and supported near first and second ends by a support frame; and a nut disposed around the rotating shaft that moves axially along the rotating shaft in response to operation of the motor; and wherein the nut comprises first and second nuts, wherein the first nut comprises screw threads in a first direction and the second nut comprises screw threads in a second direction substantially opposite the first direction.

2. The apparatus of claim 1, wherein the first part further comprises a support bar connected to the support frame.

3. An apparatus, comprising:

a first part connected to a motor;

a second part configured to be attached to a seat; and a link connected to the first part, the second part, and a wheel, configured to transfer movement of the first part to the wheel;

wherein the first part comprises:

a rotating shaft connected to the motor and supported near first and second ends by a support frame; and a nut disposed around the rotating shaft that moves axially along the rotating shaft in response to operation of the motor; and wherein the link comprises:

a first link comprising a first end connected to the second part and a second end connected to the nut; and a second link comprising a first end connected to the nut and a second end connected to the wheel.

4. The apparatus of claim 3, wherein the second end of the second link is rotatably connected to a connecting arm comprising a rotating bar configured to rotate the wheel in response to operation of the links.

* * * * *